Dec. 31, 1935.  W. E. LIPPERT  2,026,184
CIRCUIT BREAKING DEVICE
Filed Sept. 2, 1933  2 Sheets-Sheet 1

INVENTOR.
Walter E. Lippert.
BY
ATTORNEY

Dec. 31, 1935. W. E. LIPPERT 2,026,184
CIRCUIT BREAKING DEVICE
Filed Sept. 2, 1933    2 Sheets-Sheet 2

INVENTOR.
Walter E. Lippert.
BY
ATTORNEY

Patented Dec. 31, 1935

2,026,184

UNITED STATES PATENT OFFICE 2,026,184

CIRCUIT BREAKING DEVICE

Walter E. Lippert, New Brighton, Staten Island, N. Y., assignor to Underwood Elliott Fisher Company, New York, N. Y., a corporation of Delaware Application September 2, 1933, Serial No. 687,972

14 Claims. (Cl. 200—138)

The phenomena of overheating which accompanies the excessive loading of electrically operated appliances, and more particularly the overheating of electric motors which results from either overloading or stalling, with its attendant injurious effects, is well known. It is, accordingly, a salient object of this invention to provide a thermally responsive device automatically operable to disconnect an electrically operated appliance from its source of electrical energy as an incident to a rise in the temperature of the appliance above a predetermined maximum.

It is another object of the invention to provide a device of the character described, all elements of which are adapted for repeated and continuous operation without replacement or deterioration.

A further object of the invention is the provision of a thermally responsive circuit breaking device adapted to be connected in the circuit of an electrical appliance and associated with said appliance in heat conducting relation to effect the breaking of said circuit when the temperature range of said appliance exceeds a predetermined maximum.

Another object of the invention resides in the provision of a device of the character described which shall be economical of manufacture and assembly, compact, and simple in structure and relation of parts to facilitate repair and insure uniformity and continuity of operation.

A more specific object of the invention is to provide a device of the character described including a base of high thermal conductivity, a manually operable switch mounted on said base to provide a series connection between a source of electrical energy and an energy consuming appliance, a thermally responsive element normally effective to maintain said switch in closed circuit position, and an arc interrupting element automatically movable to a position to prevent the passing of an arc between the parts of said switch, as an incident to the movement of said switch to open circuit position under the control of said thermally responsive element.

Other objects and advantages of the invention will become apparent from the following detailed description taken in connection with the accompanying drawings in which, Fig. 1 is a plan view of a circuit breaking device embodying a preferred form of the invention, the housing being removed.

Figure 1:
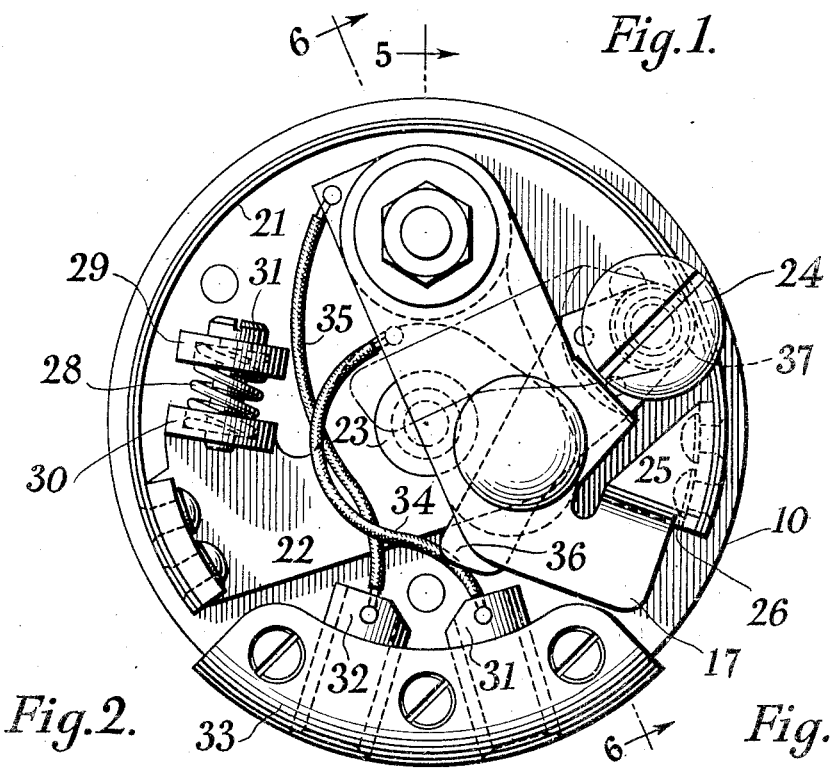

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For the purposes of this disclosure, the invention is shown as applied to an electric motor, but it will be understood to be equally applicable to any electrical appliance in which it is desired to prevent the operating temperature of said appliance from exceeding a predetermined maximum. It is likewise contemplated that the invention may be attached to an external surface of an electrical appliance, built into or incorporated with, the structure thereof, or thermally associated therewith in any other desired manner.

Figure 4:
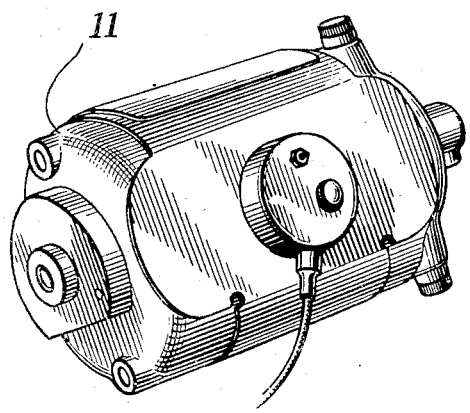
Fig. 4 is a perspective view illustrating one form of the device of the present invention applied to the exterior of an electric motor.

Referring to the drawings, a base 10, which, in this instance, is of circular contour and preferably formed from material of high thermal conductivity, is adapted to be connected in heat conducting relation to an electrical appliance, such for example, as a motor 11 (Figure 4).

Figure 5:
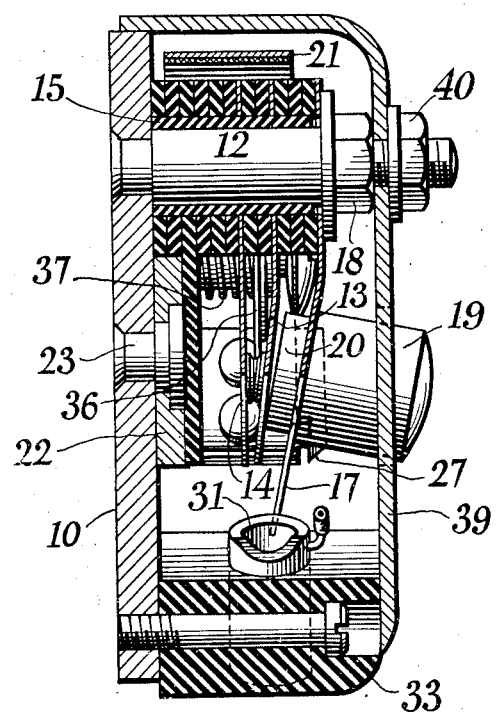
Fig. 5 is a sectional view taken along the line 5—5 of Fig. 1.
Figure 6:
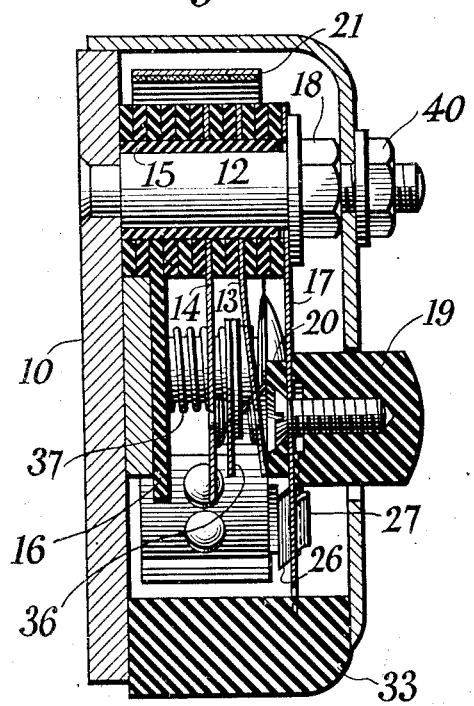
Fig. 6 is a sectional view taken along the line 6—6 of Fig. 1.
Figure 7:
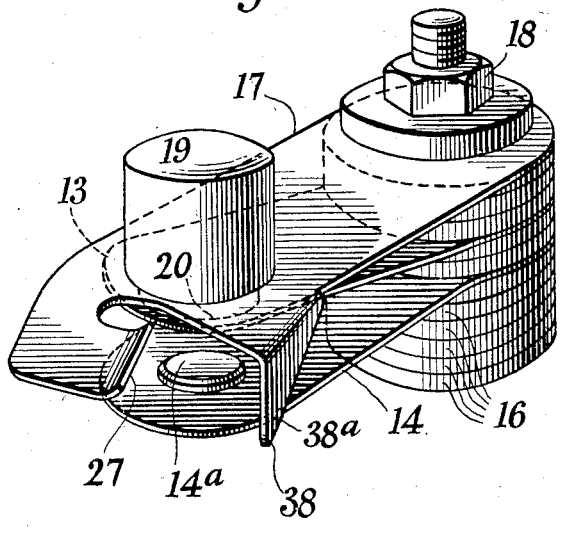
Fig. 7 is an enlarged perspective view of a preferred form of certain parts of the device.

A circuit controlling switch is operatively mounted on the base 10. Referring particularly to Figs. 5, 6 and 7, a post 12, desirably of heat conducting material, is fixed to and projects substantially normally of the base. Resilient switch arms 13 and 14, one end of each of which is anchored with respect to the post 12, extend co-angularly therefrom in spaced relation from one another and from the base. The respective arms 13 and 14 are electrically insulated from the post 12 as well as from each other by an insulating sleeve 15 which telescopes the post and a plurality of insulating spacing washers 16 adapted to be readily assembled on the sleeve in the relation clearly shown in Fig. 5. In the present instance, the switch arms 13 and 14 are each provided with apertures adjacent one of their respective ends, to permit them to be assembled on the sleeve 15 after the latter has been positioned on the post 12.

The switch, comprising arms 13 and 14, is adapted to be closed in any preferred manner to establish an electrical circuit. In the present embodiment of the invention, a manually actuated switch operating arm 17 is operable to move the switch arm 13 into engagement with the arm 14 to establish a circuit therebetween.

Referring to Figs. 5 and 6, the operating arm 17 comprises a resilient metallic member, one end of which is assembled on the post 12 in spaced insulated relation from arm 13, the body of the arm extending radially from the post in co-angular relation with the arms 13 and 14. The switch and operating arms, together with their associated insulating collars 16 and the insulating sleeve 15, are maintained in assembled relation on the post 12 by means of a nut 18 engaging the threaded outer end of the post.

A button 19, fixed to the switch operating arm adjacent its free end in any desirable manner, provides an insulated means of manipulating the arm, and an insulating washer 20 conveniently arranged co-axially with, and retained in position on, the opposite surface of the arm by the same means which functions to secure the button 19, prevents a short circuit from the arm 13 through the switch operating arm 17.

To prevent the possibility of short circuiting the arm 14 through the base 10, one of the insulating washers 16 is elongated to extend radially from the post 12 in underlying relation throughout substantially the entire length of arm 14, as best shown in Fig. 6.

The switch operating arm 17 is adapted to be retained in the position in which it functions to establish a circuit between the switch arms 13 and 14, by means operable to permit the operating arm to move to open circuit position as an incident to an abnormal rise in the temperature of the appliance.

Figures 2, 3:
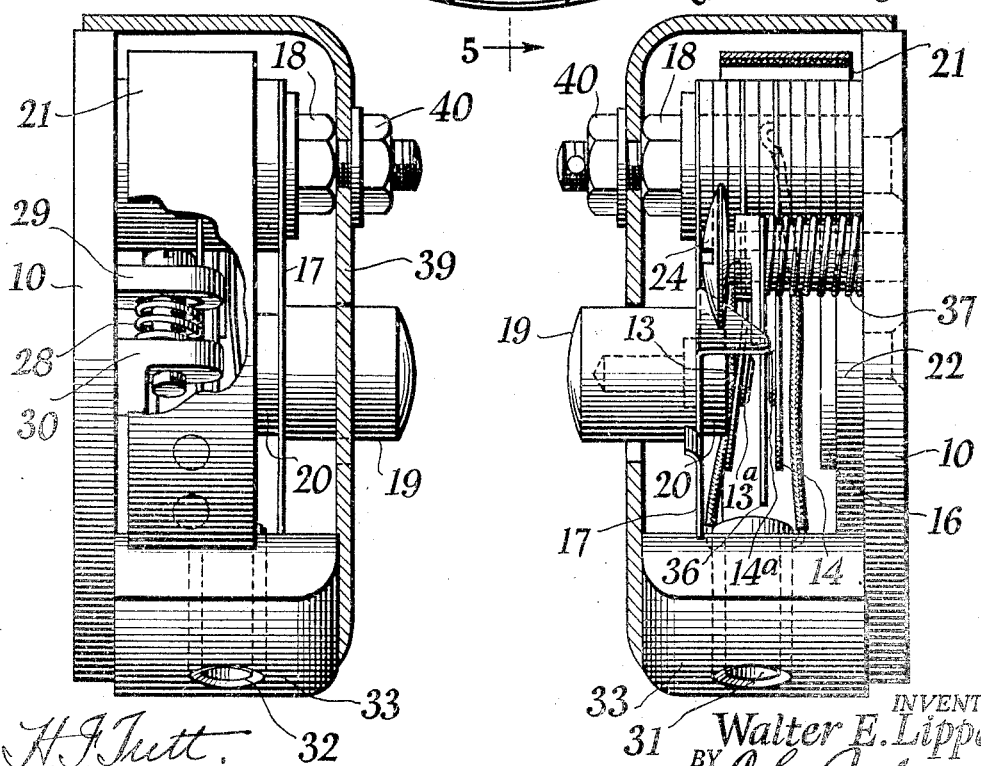
Fig. 2 is an elevational view partially in section, taken from a plane spaced to the left of Fig. 1 and substantially parallel to the line 5—5 thereof.
Fig. 3 is an elevational view simila to Fig. 2, taken from a plane spaced to the r. ht of line 5—5 of Fig. 1.

As shown in Fig. 1, a thermal element 21, in this instance, a bimetallic strip of circular contour substantially concentric with the base, is rigidly connected adjacent one of its ends to the upwardly turned extremity of an irregularly shaped arm 22 pivotally mounted near its inner end on the base, at 23. The opposite end of the element 21 is free to move radially in response to temperature fluctuations and is guided against displacement from a plane parallel to the surface of the base, by a headed stud 24 fixed to the base 10, the head for this purpose, extending over the upper edge of the element 21, as shown in Figure 1. The free end of the element 21 is effective to prevent movement of the operating arm 17 to open circuit position so long as the temperature of the appliance remains below a predetermined point, and to release the arm to break the circuit to the appliance when its operating temperature exceeds the same point. Referring to Figs. 1, 3 and 6, the free end of the element 21 has fixed thereto a keeper, conveniently formed of a triangularly shaped flat plate 25 having a laterally projecting flange, the outer edge 26 of which is beveled downwardly to co-act with the upwardly turned lip 27, of a latch formed integrally with the operating arm 17. It will be apparent that when the operating arm is depressed, its resilient character will permit the lip 27 to cam over the beveled edge 26 of the flange on the plate 25, and then snap under the beveled flange to maintain the arm 17 in closed circuit position.

Pressure of the operator's finger on the button 19 flexes the resilient operating arm 17 inwardly against its tendency to remain straight the arm contacting the outermost resilient switch arm 13 lying parallel with and beneath the operating arm 17, to likewise flex the latter inwardly and cause its contact stud 13a to collide with the contact stud 14a of the co-acting switch arm 14, and thereby close the circuit.

As the operating arm 17 is forced inwardly, the free edge 27 of the latch formed on the operating arm wipes over the beveled edge 26 of the keeper 25 mounted on the thermally responsive element 21 in a direction transverse to the direction of movement of the thermally responsive element, the lip 27 yielding slightly in its travel past the edge 26, until the lip clears the edge 26, whereupon the inherent resilience of the lip causes it to resume its normal position relatively to the operating arm, which results in springing the lip beneath the edge 26 of the keeper to latch the operating arm 17 in its effective position and maintain the circuit closed.

The occurrence of a predetermined temperature affects the thermally responsive element 21 to draw the keeper away from the latch in a direction transverse to the direction of travel of the operating arm, to disengage the keeper from the latch, whereupon the inherent resilience of the operating arm causes the operating arm to straighten and spring away from or release the outermost switch arm 13, the inherent resilience of which straightens such arm and withdraws its contact 13a from the contact 14a on the switch arm 14, thus to interrupt the circuit.

It will be noted that because the release of the operating arm is effected by withdrawing the keeper from the latch, instead of operating the latch, and because such withdrawal is effected in a direction transverse, or at an angle, to the direction of travel of the operating arm 17, a satisfactory latching action is effected, and the thermally responsive element 21 is relieved of all strain and distortion when the latch and keeper are disengaged, the flat underface of the keeper 25 merely sliding away from the edge contact of the lip 27 therewith.

Means is provided to effect calibration of the device, by adjusting the extent of overlapping of the lip 27 by the shoulder 26, and thus varying the extent of movement of the element 21 required to release the switch operating arm. A coiled spring 28, acting between a lug 29 formed integrally with the base 10 and an upwardly turned ear 30 of the arm 22, normally tends to turn the latter counter-clockwise, as viewed in Fig. 1, and thus move the element 21 circumferentially in a direction to decrease the extent of the overlapping relation of the parts 26 and 27. The action of spring 28 is adapted to be controlled by a headed screw 31, projected through the lug 29 into threaded engagement with the ear 30 of the arm 22.

It will be understood that the device may be electrically connected to an appliance in any desirable way to control a flow of current therethrough. In the drawings, terminal bushings 31 and 32, seated in a block of insulating material 33, are electrically connected to the switch arms 13 and 14 by conductors 34 and 35, respectively. Hence, the switch arms may be connected in series with a source of electrical energy and an appliance, the circuit of which is to be controlled.

The invention includes the provision of means effective to interrupt the arc which results from the opening of contacts through which current of relatively high potential flows. In the present instance, such means is automatically rendered effective upon movement of the switch to open or circuit breaking position, and is restored to inoperative position as an incident to closing of the switch. An arm of insulating material 36 formed integrally with a sleeve pivotally supported on the stud 24, is normally urged in a counter-clockwise direction (as viewed in Fig. 1) by a coiled spring 37, to a position in which it is interposed between contact points 13a and 14a (Figure 3) on the switch arms 13 and 14, respectively. When the switch is open, the arm 36 accordingly acts to prevent the passage of an arc between its contacts. Manipulation of the switch operating arm 17 automatically serves to move the arc preventing arm 36 out of its normal position between the contacts.

Referring particularly to Figs. 1, 3, and 7, a laterally extending camming lug 38, formed integrally with the switch operating arm 17, is provided with a camming edge 38a, the angle of which is such that when the operating arm is in its open circuit position, the edge has receded to its maximum extent to permit the arc interrupting arm 36 to rotate to the position shown in Fig. 1, where it will be interposed between the contacts 13a and 14a. As the switch operating arm 17 is depressed to close the circuit, the camming edge 38a acts upon the arc interrupting arm 36 to rotate the latter to the position shown in dotted outline in Fig. 1, to permit the contacts to close.

The entire assembly is protected by a housing 39, retained in position by a nut 40 engaging the threaded end of stud 12. A suitable aperture in the housing permits the finger piece 19 to project therethrough.

It will be evident that the device may be employed in conjunction with a main circuit controlling switch, in which event it will be connected in series between the main switch and appliance and need only be resorted to when the temperature of the appliance exceeds the predetermined maximum to cause a breaking of the circuit, or, it may be singly utilized in series between the source of electrical energy and the appliance, where the latter is to be used continuously and the circuit opened only at such times as the temperature of the appliance exceeds the desired maximum operating temperature.

From the foregoing description it will be obvious that I have provided a thermally responsive circuit breaking device which is compact, efficient, inexpensive and composed of a minimum number of parts.

I claim as my invention:

1. A mechanism of the class described comprising in combination, a base of heat conducting material adapted for attachment in heat conducting relation to an electric power consuming device, a pair of electrical contacts mounted on, and electrically insulated from, said base and from each other, resilient means normally tending to maintain said contacts in spaced, open circuit relation, manipulative means operable to move said contacts into engaging, closed circuit relation, an arc interrupting element pivotally mounted on said base and arranged for movement into a position between said contacts to interrupt an arc therebetween, yieldable means acting to move said element to arc interrupting position, cam means actuated as an incident to said operation of the manipulative means, to move said element against the action of said yieldable means out of arc interrupting position, a bimetallic thermal element of arcuate contour adjustably fixed to said base adjacent one of its ends, its opposite end being free to move relatively thereto, a part on the free end of said element effective to overlie and lock said manipulative means in closed circuit position, and means to adjust the position of the fixed end of said element with respect to said base in a direction circumferential of the arc of said element, to increase or diminish the extent of the overlying relationship of said part with respect to said manipulative means.

2. A mechanism of the class described comprising in combination, a thermally sensitive base adapted for attachment to an electric power consuming device, a pair of normally spaced electrical contacts resiliently mounted on, and electrically insulated from, said base and from each other, manipulative means operable to move said contacts into engaging, closed circuit relation, an arc interrupting element mounted on said base and arranged for movement into a position between said contacts to interrupt an arc therebetween, yieldable means acting to move said element to arc interrupting position, means actuated as an incident to said operation of the manipulative means, to move said element against the action of said yieldable means out of arc interrupting position, a thermal element adjustably fixed to said base adjacent one of its ends, its opposite end being free to move relatively thereto, a part on the free end of said element normally positioned to overlie and lock said manipulative means in closed circuit positon, and means to adjust the position of the fixed end of said element with respect to said base in a direction circumferential of the arc of said element, to increase or diminish the extent of the overlying relationship of said part on said manipulative means.

3. A mechanism of the class described comprising in combination, a base of heat conducting material adapted for attachment in heat conducting relation to an electric power consuming device, a pair of electrical contacts mounted on, and electrically insulated from, said base and from each other, resilient means normally tending to maintain said contacts in spaced, circuit broken, relation, manipulative means operable to move said contacts into engaging, closed circuit relation, an arc interrupting element pivotally mounted on said base and arranged for movement into a position between said contacts to interrupt an arc therebetween, yieldable means acting to move said element to arc interrupting position, means actuated by said manipulative means to move said element against the action of said yieldable means out of arc interrupting position, a thermal element adjustably fixed to said base adjacent one of its ends, its opposite end being free to move relatively thereto, a part on the free end of said element effective to overlie and lock said manipulative means in closed circuit position, and means to adjust the position of the fixed end of said element with respect to said base, to increase or diminish the extent of the overlying relationship of said part with respect to said manipulative means.

4. A mechanism of the class described comprising in combination, a base of heat conducting material adapted for attachment in heat conducting relation to an electric power consuming device, a pair of movable, normally spaced electrical contacts mounted on, and electrically insulated from, said base and from each other, manipulative means operable to move said contacts into engaging, closed circuit relation, an arc interrupting element pivotally mounted on said base and arranged for movement into a position between said contacts to interrupt an arc therebetween, means normally effective to move said element to arc interrupting position, means effective as an incident to said operation of the manipulative means, to move said element out of arc interrupting position, a thermal element adjustably fixed to said base adjacent one of its ends, its opposite end being free to move relatively thereto, a part on the free end of said element effective to overlie and lock said manipulative means in closed circuit position, and means to adjust the position of said element with respect to said base, to increase or diminish the extent of the overlying relationship of said part with respect to said manipulative means.

5. An electric switch comprising in combination, a thermally sensitive base, relatively movable circuit controlling contacts on said base normally tending to remain in open circuit position, means to relatively move said contacts to establish a circuit therebetween, a thermally responsive element operative to retain said contacts in closed circuit position while the temperature of the switch remains below a predetermined maximum, and to release said contacts to interrupt said circuit when the temperature of the switch rises above the predetermined maximum, and means automatically movable to a position between said contacts to prevent an arc therebetween when said thermal element releases said contacts to open the circuit.

6. An electric switch comprising in combination, a base, relatively movable circuit controlling contacts on said base, means to relatively move said contacts to establish a circuit therebetween, a thermally responsive element operative to retain said contacts in closed circuit position while the temperature of the switch remains below a predetermined maximum, and to release said contacts to break said circuit when the temperature of the switch rises above the predetermined maximum, means automatically movable to a position between said contacts to prevent an arc therebetween when said thermal element releases said contacts to break the circuit, and means to adjust the position of said thermal element to regulate the temperature at which said contacts will be released to open circuit position.

7. In an electric switch mechanism, the combination of a pair of resilient switch arms arranged to normally be in superposed relation, contacts on the respective switch arms opposed to, and normally separated from each other; a manually operable resilient member normally disengaged from, and operable to bear against and positively flex one of the resilient switch arms towards the remaining switch arm to abut the contacts; a thermally responsive element; and a latch connected to the manually operable member, and engageable with the thermally responsive element to lock the operable member in its effective position.

8. In an electric switch mechanism, the combination with a pair of relatively movable contact supports; contacts in opposed relation on the respective supports; a manually operable member pressure on which shifts the member in one direction to effect engagement of the contacts; a keeper; a latch connected to the manually operable member, and engageable with the keeper, to lock the operable member in its effective position; and a thermally responsive element on which the keeper is mounted and operable in a direction transverse to that in which the manually operable member travels, to withdraw the keeper from the latch and release the manually operable member upon the occurrence of a predetermined degree of temperature.

9. In an electric switch mechanism, the combination with a pair of normally separated switch terminals; and means to shift one of the switch terminals into contact with the other to close a circuit; of automatically operable means to enable the automatic separation of the switch terminals, to open the circuit; a shiftable, insulated arc-interrupting means normally positioned between the switch terminals; means operable incidentally with the closing of the circuit to displace the arc-interrupting means; and means rendered effective by the opening of the circuit to automatically restore the arc-interrupting means to its normal position.

10. In an electric switch mechanism, the combination of a pair of normally separated switch terminals, one of which may be transversely flexed into contact with the other, to complete a circuit; a shiftable arc-interrupting means; restoring means tending always to snap the arc-interrupting means to position between the switch terminals; and means actuated coincidentally with the circuit closing operation of the flexible terminal, to shift the arc-interrupting means against the influence of its restoring means, from between the terminals to enable the terminals to abut.

11. In an electric switch, the combination of a pair of normally separated switch terminals; manually operable means to flex one of the switch terminals into contact with the other to complete a circuit; a shiftable arc-interrupting means normally lying between the switch terminals; yielding means to automatically retain the arc-interrupting means in, and return it to its normal position; means actuated by the manually operable means to control the position of the arc-interrupting means; a latch on the manually operable means; a thermally responsive element, and a keeper carried by the thermally responsive element, the keeper normally engageable by the latch, and shiftable by the thermally responsive element out of the path of the latch, to release the manually operable means for return to one limit of its travel, and incidentally release the arc-preventing means for return to its effective position.

12. In an electric switch mechanism, the combination with a pair of switch terminals; and manually operable means to effect contact of the switch terminals; of a latch on the manually operable means; a thermally responsive element; a keeper engageable by the latch when effecting contact of the switch terminals, and disengageable from the latch by the thermally responsive element; a shiftable arc-interrupting means normally lying between the switch terminals; and means shiftable with the manually operable means to control the position of the arc-interrupting means.

13. In an electric switch mechanism, the combination of a pair of normally separated switch terminals; a manually operable means to transversely flex one of the switch terminals into contact with the other, the manually operable means normally tending to return to its idle position, to release the switch terminals; means to latch the manually operable means in its operated position, to hold the switch terminals in contact; a thermally-responsive element to control the latching means; and an insulated arc-interrupting means shiftable into and out of position between the terminals, and tending at all times, when out of effective position, to snap into position between the switch terminals.

14. In an electric switch mechanism, the combination with normally separated switch terminals, one of which is shiftable into and out of contact with the other; means to latch the switch terminals in contact; and an insulated, arc-interrupting means, operable in one direction by the shiftable switch terminal; of a spring to shift the arc-interrupting means into the other of its positions; and means to automatically disengage the latching means, and enable the spring to automatically operate the arc-interrupting means.

WALTER E. LIPPERT.